(12) United States Patent
Bloch et al.

(10) Patent No.: US 6,792,468 B1
(45) Date of Patent: Sep. 14, 2004

(54) FRAME-ACCURATE TRANSPORT OF MEDIA DATA ACROSS A DATA NETWORK

(75) Inventors: Eric David Bloch, San Francisco, CA (US); Jeffrey Evan Beall, Palo Alto, CA (US); Gordon Anson Durand, San Jose, CA (US); Ralph Hill, Los Gatos, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/441,722

(22) Filed: Nov. 16, 1999

Related U.S. Application Data

(63) Continuation-in-part of application No. 08/733,478, filed on Oct. 18, 1996, now Pat. No. 6,005,600.

(51) Int. Cl.$^7$ ............................................. G06F 15/16
(52) U.S. Cl. ........................... 709/231; 725/87; 725/88; 709/102; 709/203; 709/217; 709/219
(58) Field of Search .................................. 709/203, 231, 709/102, 219; 375/240.01; 345/473; 348/180; 386/68; 725/87, 88

(56) References Cited

U.S. PATENT DOCUMENTS

| | | | |
|---|---|---|---|
| 5,206,929 A | | 4/1993 | Langford et al. |
| 5,414,808 A | | 5/1995 | Williams |
| 5,682,326 A | | 10/1997 | Klingler et al. |
| 5,790,794 A | | 8/1998 | DuLac et al. |
| 5,799,150 A | * | 8/1998 | Hamilton et al. ........... 709/203 |
| 5,881,202 A | * | 3/1999 | Herz ............................ 386/68 |
| 5,956,716 A | | 9/1999 | Kenner et al. |
| 5,982,364 A | | 11/1999 | Beckwith |
| 6,005,600 A | | 12/1999 | Hill |
| 6,014,706 A | * | 1/2000 | Cannon et al. .............. 709/217 |
| 6,029,194 A | * | 2/2000 | Tilt .............................. 709/219 |
| 6,098,126 A | * | 8/2000 | Batson et al. ................ 709/102 |
| 6,141,693 A | * | 10/2000 | Perlman et al. ............. 348/180 |
| 6,167,083 A | * | 12/2000 | Sporer et al. .......... 375/240.01 |
| 6,201,924 B1 | | 3/2001 | Crane et al. |
| 6,320,588 B1 | * | 11/2001 | Palmer et al. ............... 345/473 |

* cited by examiner

*Primary Examiner*—Mark R. Powell
*Assistant Examiner*—Chau Nguyen
(74) *Attorney, Agent, or Firm*—Lee & Hayes, PLLC

(57) ABSTRACT

A software architecture and control protocol that provides applications with control over the transport that is frame-accurate, random-access, real-time and stream-based. Conventional server-based data network where media data resides on the server does not provide a frame accurate control of media data playback on a client workstation. The present invention provides control on the client with the implementation of a "client pull" data transport model. According to the present invention, requests for media data are sent from the client to the server one request at a time. The server, upon receiving the requests, retrieves the corresponding frames of media data and transmits the media data back to the client one frame at a time. In this way, the present invention allows a user-interface to provide frame accurate controls on the client workstation, while allowing for real-time playback of media data that resides on the server.

26 Claims, 7 Drawing Sheets

FRAME-ACCURATE TRANSPORT OF MEDIA DATA ACROSS A DATA NETWORK

RELATED U.S. APPLICATION

The instant application is a continuation-in-part of U.S. patent application Ser. No. 08/733,478, filed Oct. 18, 1996, entitled "A High-Performance Player for Distributed, Time-based Media," by Ralph D. Hill, now U.S. Pat. No. 6,005,600, issued Dec. 21, 1999, and assigned to the assignee of the present invention (Microsoft Corporation, Redmond, Wash.), which is hereby incorporated by reference.

FIELD OF THE INVENTION

The present invention pertains generally to audio/video playback devices. More particularly, the present invention pertains to playback of media data held in storage devices across a data network.

BACKGROUND OF THE INVENTION

Today, a wide variety of applications demand that a workstation display a moving image with accompanying sound. Often these workstations must access the audio and video data from multiple sources, some local and some accessed via a network connection. This data must be supplied to the display unit at a constant rate in order to achieve a steady picture. Problems arise when the data is not provided to the workstation at the required rate.

This problem is particularly acute when the data source must be accessed via a network. Delays in accessing data over standard networks tend to be longer and have a wider variance than accessing data from a local source (e.g., local RAM, local disk drive). Conventionally, one must insure that the network provides the data at a constant rate in order to achieve an acceptable output.

One way of achieving a constant data rate is known as the "server push" solution. In a system implemented with the "server push" model, the client sends a request specifying what to play, and how fast to play it. The server responds by sending the requested information at the requested rate. One advantage of the "server push" solution that the client hardware and software required is very simple.

That approach, however, has several drawbacks. First, in "server push" systems, the client sends requests to the server when the user issues a playback control signal, such as "play", "stop," or "fast forward." The user, however, cannot specify a particular frame or frames to be played because the playback logic resides within the server. Applications that lack frame accurate playback capability may be sufficient for most users. However, those applications cannot meet the demand of developers and artists for creating animation and special effects. Therefore, there exists a need for an improved system and method of providing frame-accurate transport of media data across a data network.

Further, in "server push" systems, it is not possible to play multiple clips seamlessly across the network if the clips are stored in different locations. Usually, after each clip is played, the user has to manually select another clip to be played. In other cases where a playlist is specified, there is usually a short "break" between the ending of one clip and the beginning of another. This is caused by the fact that the client workstation has no control over when the movie data is sent. Thus, there exists a need for a system and method of providing seamless playback of multiple clips across a data network.

SUMMARY OF THE DISCLOSURE

Accordingly, the present invention provides a software architecture and control protocol that allows frame-accurate, random-access, real-time and stream-based media data over a data network. Conventional server-based data network does not provide a frame accurate control of server-based media data playback on a client workstation. In contrast, the present invention provides a "client pull" data transport model where media data is "pulled" from the server across the data network one frame at a time, and where requests for media data are sent from the client one at a time. In this way, frame accurate real-time playback of media data that resides on the server can be achieved.

The present invention enables a user to retrieve a single frame of media data across the data network. Particularly, according to one embodiment of the invention, when a client receives user inputs that requests a single frame to be played, the client translates the user inputs into into a frame accurate request. The client then sends the frame accurate request to the server. The server, upon receiving the request, retrieves the requested frame and transmits the requested frame back to the client. Rendering processes and decompression processes, etc., are then carried out to render the frame of media data on a display.

Further, the user of the present invention is able to specify a clip of media data to be played on the client. When the client receives user inputs that request a clip or clips to be played, the client translates the user inputs into a series of frame accurate requests. The client workstation then sends the frame accurate requests one at a time to the server. The server responds to the requests by sending the requested frames one at a time. Significantly, the playback logic of the present invention is implemented in software processes residing on the client side. Thus, in contrast to conventional "server push" playback systems, software processes residing on the client "pulls" specific frame of media data from the server one frame at a time.

Embodiments of the present invention include the above and further include a computer readable medium containing therein computer readable codes for causing a computer system to perform a step of playing media data across a data network. According to the present embodiment, the method includes the step of receiving a playback control signal from a user via a user interface. If the playback control signal specifies a particular frame to be played, the present invention translates the playback control signal into a frame accurate request corresponding to a specific frame of media data. The present invention also transmits the request over the data network to a server. However, if the playback control signal specifies a particular clip or clips to be played, the present invention then translates the playback control signal into a series of requests each corresponding to a specific frame of the requested clip(s). The requests are then transmitted over the data network to the server one at a time. The server upon receiving the frame accurate requests retrieves the requsted frames and transmits them back to the client one frame at a time. An advantage of the present invention is that frame accurate control and playback of server based media data across a data network can be achieved.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "generating", "associating", "assigning" or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

Figure 1:
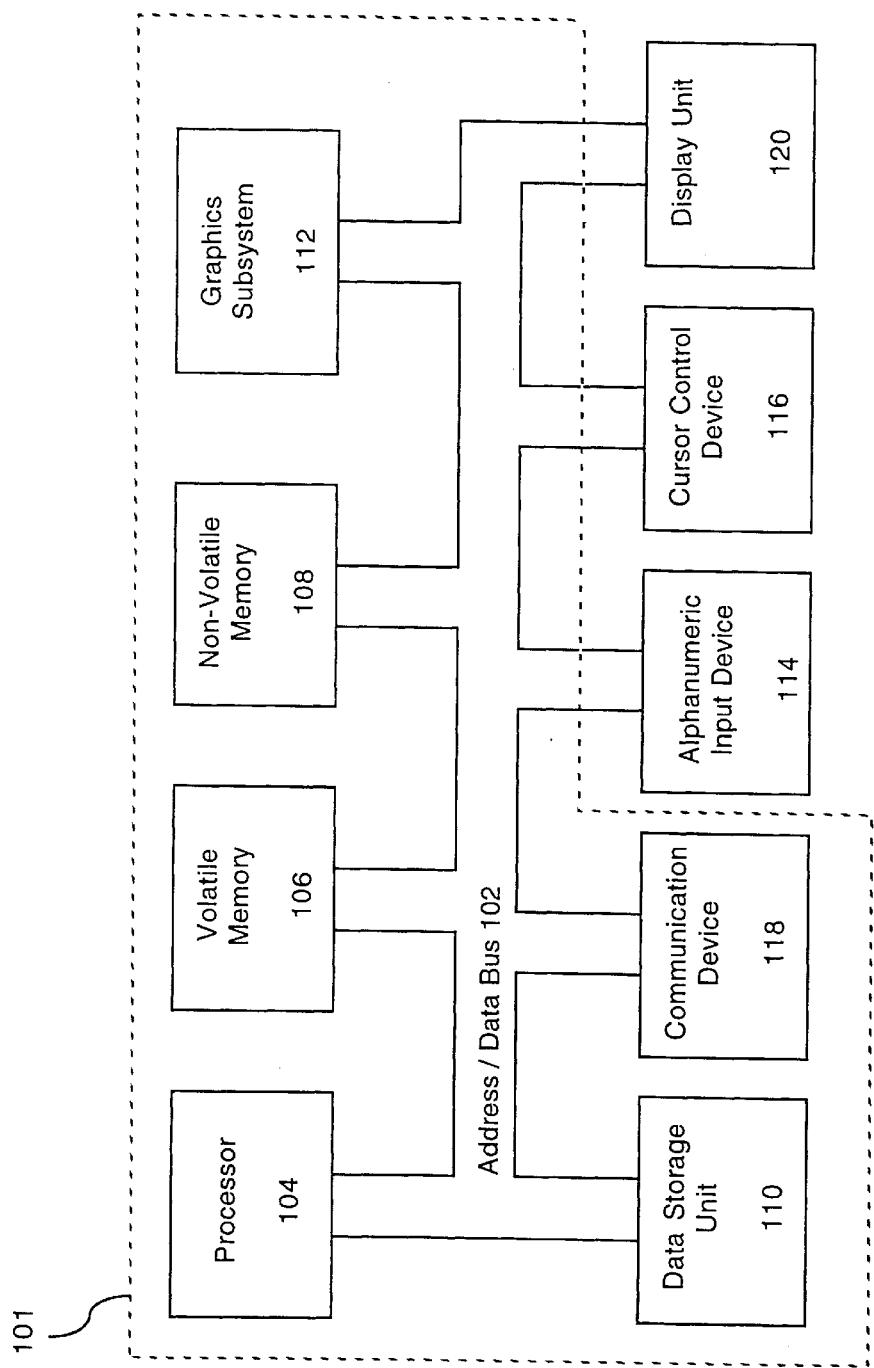
FIG. 1 is a block diagram illustrating an exemplary computer system used as part of a media data playback system in accordance with one embodiment of the present invention.

With reference to FIG. 1, portions of the present invention are comprised of computer-readable and computer executable instructions which reside, for example, in computer-usable media of a computer system. FIG. 1 illustrates an exemplary computer system 101 used as a part of a computer graphics system in accordance with one embodiment of the present invention. It is appreciated that system 101 of FIG. 1 is exemplary only and that the present invention can operate within a number of different computer systems including general purpose computer systems, embedded computer systems, and stand alone computer systems specially adapted for generating 3-D graphics. An example of computer system 101 is the $O_2$ computer manufactured by SGI, Inc., of Mountain View, Calif., which is an assignee of the present invention.

Computer system 101 includes an address/data bus 102 for communicating information, a central processor 104 coupled with bus 102 for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 101 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Memory units of system 101 include 106, 108 and 110. Computer system 101 can also include a graphics subsystem 112 (e.g., graphics adapter) coupled to the bus 102 for providing decompression and other graphics processing functions.

Computer system 101 can further include a communication device 118 (e.g., network interface card) coupled to the bus 102 for interfacing with a network. Also included in computer system 101 of FIG. 1 is an optional input device 114 including alphanumeric and/or function keys coupled to the bus 102 for communicating information and command selections to the central processor 104. Computer system 101 also includes an optional cursor control or directing device 116 coupled to the bus 102 for communicating user input information and command selections to the central processor 104.

Display device 120 is coupled to the bus 102 for providing display information to the users. Optional cursor control device 116 allows the computer user to dynamically signal the two dimensional movement of a visible symbol (cursor) on a display screen of display device 120. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to receiving inputs by other means such as, for example, voice commands.

The present invention is directed to a system and method for enabling a user to view media data (e.g., movie data, video data, audio data, meta-data, etc.) using a workstation connected to a digital network. The user may change both speed and direction, as well as select a particular frame of the media data to be played. According to the present invention, digitized movie data may be accessed from different sources (e.g., network servers, local disks). Particularly, in the present invention, playback engines are implemented within the clients (e.g., workstations) rather than the server. Because the playback engines are implemented within the clients, frame accurate transportation of media data can be achieved.

Figure 2:
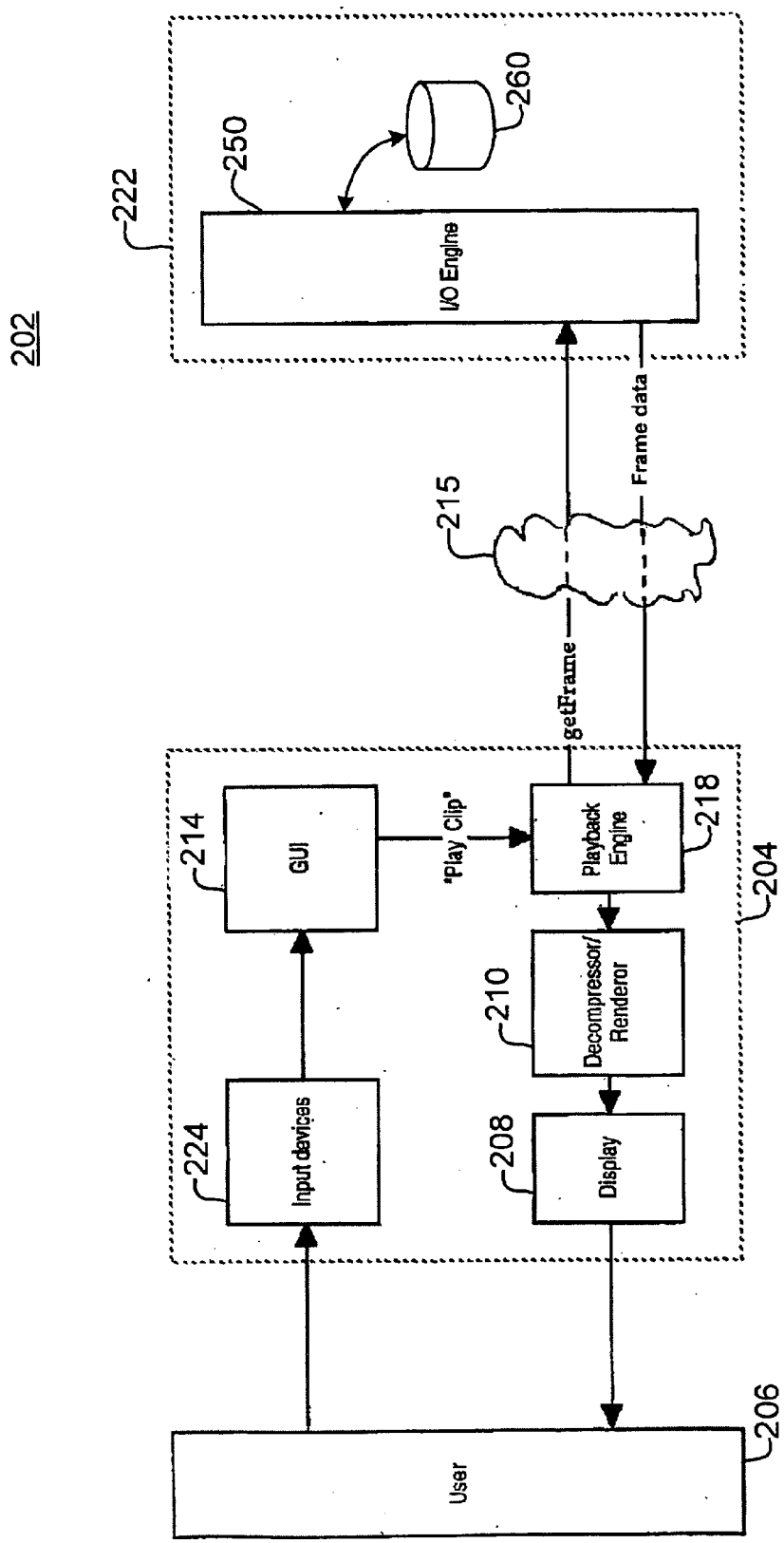
FIG. 2 is a block diagram of a digital network environment according to one embodiment of the present invention.

FIG. 2 is a block diagram of a digital network environment 202 within which the invention is used. A user 206 utilizes the workstation 204 to play movie data. The workstation 204 may be a conventional personal computer (e.g., computer system 101), or dedicated hardware specially suited for audio/video playback. The user 206 views the movie data on display 208 while issuing control commands (e.g., "go forward," "go backward," "play faster") via input devices 224 (e.g., keyboard, mouse, joystick). Significantly, the user 206 may issue a frame accurate play command to indicate a specific frame to be played even though that frame is stored in a remote location across a data network.

Movie data is composed of synchronized audio and video information. This information is broken into fundamental units called frames. For each video frame there is an associated audio frame. A video frame contains the video information to display a single image. An audio frame contains the audio information associated with that image. For ease of notation, the term 'frame' will be used throughout to refer to either audio or video frames, as they are generally treated the same.

A clip is a sequence of frames. The movie data of interest to a user will be composed of one or more clips.

Clips may be stored in different locations within the digital network environment 202. For purposes of discussion, assume that the movie data of interest to the user contains N clips, each stored in a server 222 that is coupled to the workstation 204 via data network 215. The clips may or may not be stored according to a conventional compression format.

The workstation 204 contains a graphical user interface (GUI) 214 responsible for the receiving control information from the user 206. Examples of control information include commands to stop, reverse play, speed-up play, slow-down play, or skip to an arbitary frame. GUI 214 is also configured for receiving the filename of the clip to be played and/or the frame number of a particular frame to be played.

The display 208 provides a video image for the user 206, while a conventional speaker (not shown) provides the audio. The decompressor/renderor 210 is responsible for decompressing the video and audio and presenting them to the display 208 in correct synchronization. Note that decompression is only required if movie data is stored in a compressed format (e.g., MPEG, etc.).

According to the present embodiment, playback logic is implemented within a playback engine 218 that resides on the client workstation 204. Particularly, the playback engine 218 translates the user control inputs (e.g., "play clip A") received by GUI 214 into frame accurate requests (e.g., "Get Frame 1 of clip A"). The frame accurate requests are then sent across data network 215 to server 222. It should be noted that, in the present embodiment of the invention, each frame accurate request is associated with a single frame of movie data. Thus, in order to play a clip containing M frames, playback engine 218 generates M requests and transmits them to server 222.

It should be noted that the playback engine 218 is responsible for automatically generating frame accurate requests when the user control inputs specify a clip or clips to be played. For example, if a clip is requested by the user, playback engine 218 automatically generates frame accurate requests for all the frames of the clip, and transmits the requests to appropriate servers in which the frames are stored.

Figure 7:
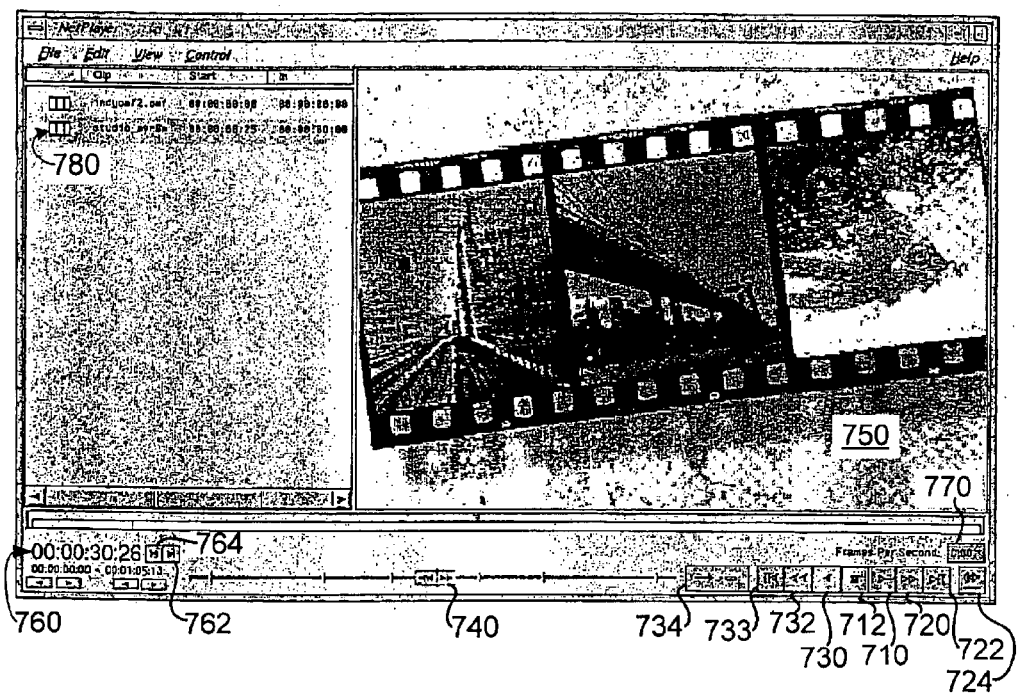
FIG. 7 illustrates an exemplary implementation of a graphical user interface for an network media player in accordance with an embodiment of the present invention.

In the present embodiment, GUI 214 includes buttons, scroll bars, sliders, etc., that allow users to control the rate a clip is played, playback direction, etc. An exemplary implementation of GUI 214 is illustrated in FIG. 7. As shown, GUI 214 a display window 750 for displaying the frames and a frame number window 760 for displaying the frame number of the frame that is currenlty played. Further, in the illustrated embodiment, GUI 214 includes play button 710, fast forward button 720, reverse play button 730, forward pause button 722, reverse pause button 733, stop button 712 and mute button 724. Significantly, GUI 214 includes a slider 740 that indicates the position of the currently played frame within the clip. GUI 214 allows users to select a particular frame to be displayed within display window 750 by moving slider 740. Also illustrated are forward button 762 and reverse button 764 which allows user to play the clip one frame at a time. GUI 214 may also include an input field 770 that allows users to enters a desired playback rate and a window 780 for displaying a playlist (e.g., a list of clips to be played). GUI 214 also includes a button 734 for allowing a user to save the clip to a local storage disk.

GUI 214 further includes a window for displaying a playlist. A playlist generally includes a list of sequence of media data clips to be played. Typically, each clip has a "clip name," a "host name," the beginning frame number and the ending frame number. In the present embodiment, "clip name" is the name of the file that contains the media data, "host name" is the name of the server that contains the desired clip.

Playback engine 218 is responsible for generating frame accurate requests based on the playback rate and direction specified by the user. For example, if a playback rate of 2× is selected by the user, playback engine 218 generates frame accurate requests for every other frame of the clip and transmits the requests to the appropriate servers in which the frames are stored. As another example, if reverse playback is chosen by the user, then playback engine 218 generates frame accurate requests for all the frames of the clip and transmits the requests to the appropriate servers in reverse order. Essentially, playback logic is built in the playback engine 218 and resides within the client workstation 204.

Referring still to FIG. 2, server 222 includes an I/O engine 250 and data storage 260. I/O engine 250 is responsible for receiving frame accurate requests generated by playback engine 218, translating the frame accurate requests into low-level I/O signals and retrieving the requested movie data stored at data storage 260. I/O engine 250 is also responsible for transmitting the requested movie data to playback engine 218.

Figure 3:
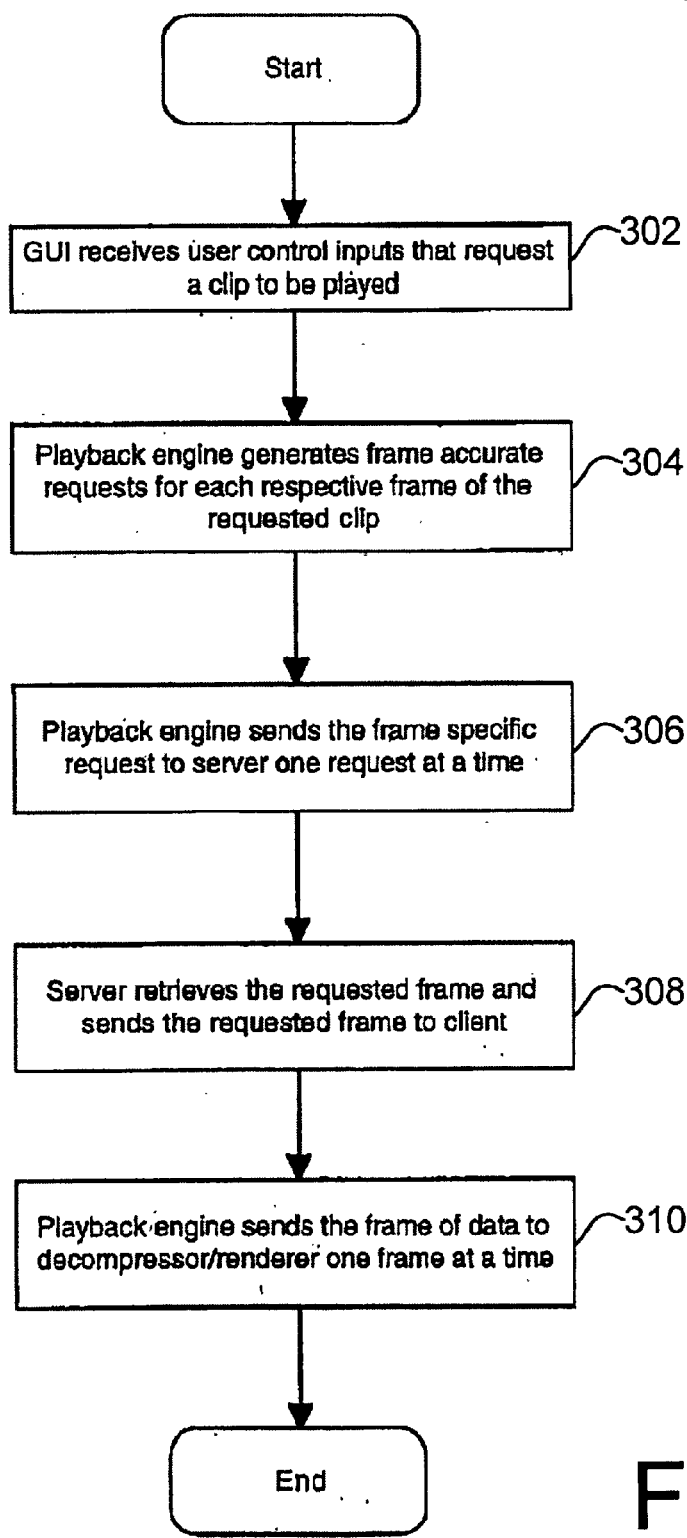
FIG. 3 is a flow diagram illustrating steps of the process of playing back a clip of media data stored remotely across a data network in accordance with an embodiment of the present invention.

FIG. 3 is a flowchart 300 illustrating steps of a process of playing a clip of media data across a data network in accordance with one embodiment of the present invention. At step 302, the graphical user interface 214 receives user control inputs from the user. In the present embodiment, GUI 214 is configured for receiving user control signals such as "play," "stop," "reverse," etc. Further, GUI . 214 is configured for receiving the filename of the clip to be played. In the present embodiment, the graphical user interface 214 also allows the user to indicate a playlist, (e.g., a list of clips) to be played.

At step 304, the playback engine 218 of the present embodiment translates the user control inputs into frame accurate requests. Particularly, the playback engine 218 determines the frames of the clip(s) to be retrieved and determines where the frames are stored based on the user inputs. For example, GUI 214 may receive control inputs that specify frame 1000 of Clip B to be played. The frame accurate request corresponding to such user control inputs would be "Get Frame 1000 Clip B." As another example, GUI 214 may receive control inputs that specify Clip C to be played. In that case, a series of frame accurate requests such as "Get Frame 1 Clip C," "Get Frame 2 Clip C," "Get Frame 3 Clip C," etc., or any other similar computer readable representation thereof, would be generated. It is important to note that each frame accurate request corresponds to a single frame only.

The data structure of an exemplary frame accurate request generated by the playback engine 218 according to an embodiment of the present invention is illustrated below in Table 1.

TABLE 1

```
struct ServerGetFrameReq
{
        int    reqType;
        void*  clipId;
        int    frame;
        bool   hasVideo;
        bool   hasAudio;
}
```

As shown in Table 1, the frame accurate request includes information relevant to the identification of the clip (e.g., clipId), the frame number of the clip and the type of the request. It should be noted that the frame accurate request does not include information as to how fast the clip should be played, playback direction, etc. In the present invention, playback logic is implemented within playback engine 218. That is, playback engine 218 determines the specific frame number of a clip to be played and generates a request for that particular frame based on the user control inputs received by GUI 214.

At step 306, the playback engine 218 sends the frame accurate requests to the server 222 across network 215 one request at a time. In the present embodiment, I/O engine 250 of server 222 receives the frame accurate requests and converts them to low-level control and I/O signals for retrieving movie data stored within storage 260.

At step 308, the I/O engine 250 retrieves the requested frames of movie data from the data storage 260, and sends the requested frames across data network 215 to the playback engine 218 of the workstation 204, one frame at a time. The I/O engine 250 also generates a frame ready acknowledge signal to be sent in association with the frame data. In the present embodiment, the frame ready acknowledge signal is "ServerFrameReadyAck." The data structure of an exemplary frame ready acknowledge signal is shown in Table 2 below.

TABLE 2

```
struct ServerFrameReadyAck
{
        NpServerAckCode        ackType;
        NpServerStatusCode     status;
        INpStatus::MajorCode   statCode;
        int                    statDetailCode;
        StatString             statDetail;
        void*                  clipId;
        int                    frame;
        bool                   hasAudio;
        bool                   hasVideo;
        int                    numAudioframes;
}
```

At step 310, as the playback engine 218 receives a frame ready signal and the frame of media data associated therewith, playback engine 218 sends the frame of data to the decompressor/renderor 210 for decompression and rendering. Because the playback engine 218 may retrieve frames at a high rate, the playback engine 218 also schedules when the frames are sent to the decompressor/renderor 210.

Playback engine 218 also synchronizes the audio video information of each frame before sending the frame to the decompressor/renderor 210. When the entire clip has been played, the process ends.

The operation of the decompressor/rendered 210 is well known in the art, and as such will not be discussed in detail herein. It should be noted that, in the present embodiment, decompression is only required for compressed data. It should also be noted that, in the present embodiment, the playback engine 218 may request the frame several seconds ahead of time and store the retrieved frames in a buffer to ensure smooth playback of the movie data. Thus, in the present embodiment, the playback engine 218 also schedules the time the requested frame is to be played.

Figure 4:
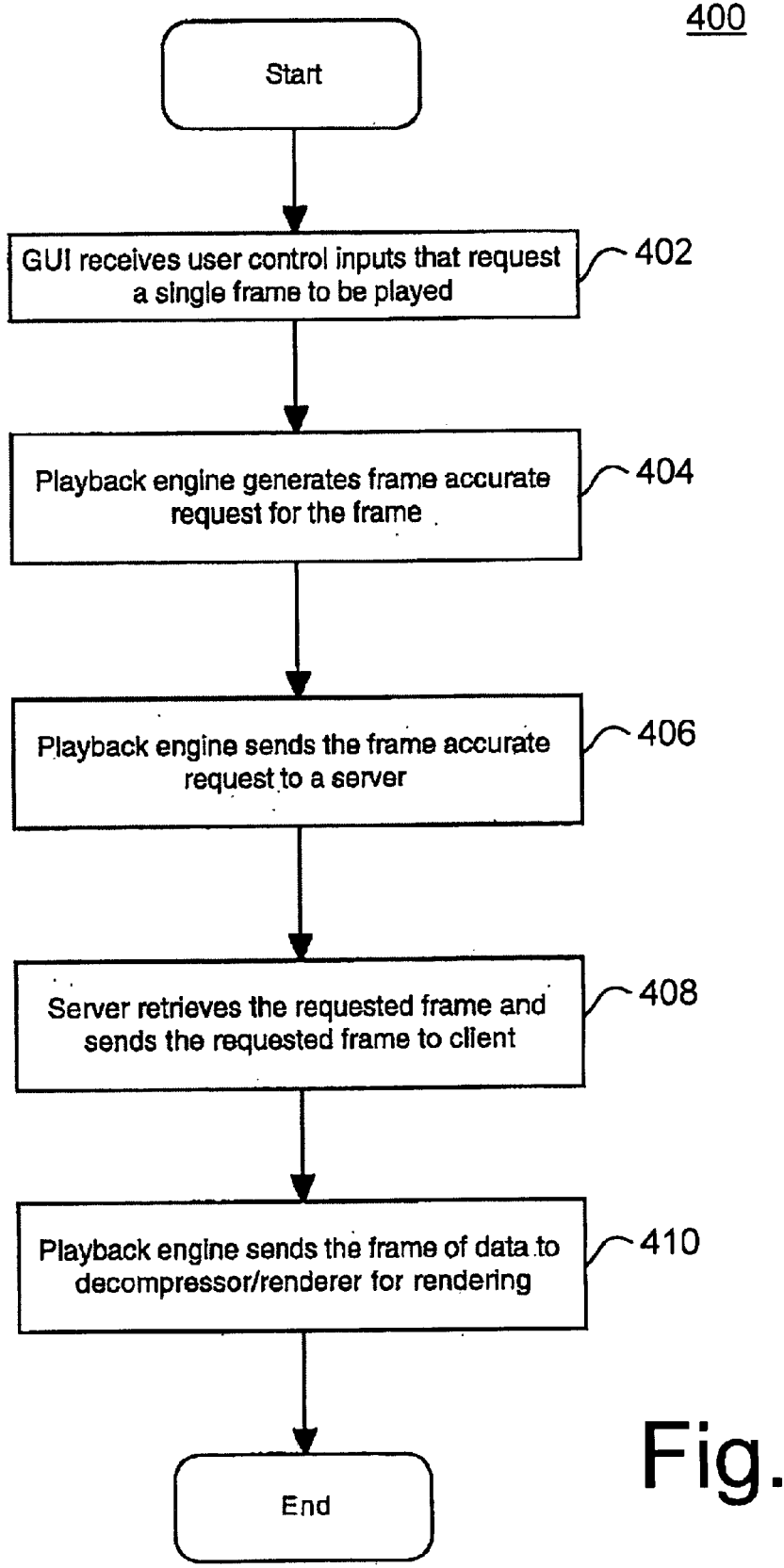
FIG. 4 is a flow diagram illustrating steps of the process of playing back a frame of media data stored remotely across a data network in accordance with an embodiment of the present invention.

FIG. 4 is a flowchart 400 illustrating steps of a process of playing a single frame of media data across a data network in accordance with one embodiment of the present invention. At step 402, the graphical user interface 214 receives user control inputs when the user requests playback of a single frame of movie data. In the present embodiment, user control inputs that request playback of a single frame of movie data may include control signals such as "play frame 500 clip A" or any similar computer readable representation thereof.

At step 404, the playback engine 218 of the present embodiment translates the user control inputs into a frame accurate request. Particularly, the playback engine 218 determines where the frame is stored. The data structure of an example of a frame accurate request is illustrated above in Table 1.

At step 406, the playback engine 218 sends the frame accurate request to the server 222 across network 215. In the present embodiment, I/O engine 250 of server 222 receives the frame accurate request and converts it to low-level control signals for retrieving movie data stored within storage 260 that comprises the requested frame.

At step 408, the I/O engine 250 retrieves the requested frames of movie data from the data storage 260, and sends the requested frame across data network 215 to the playback engine 218 of the workstation 204. At the same time, the I/O engine 250 generates a frame ready acknowledge signal. The data structure of an example of the frame ready acknowledge signal is illustrated above in Table 2.

At step 410, the playback engine 218 receives a frame ready signal and the frame of media data associated therewith, and sends the frame of data to the decompressor/renderor 210 for decompression and rendering. The operation of the decompressor/rendered 210 is well known in the art, and as such will not be discussed in detail herein. It should be noted that, in the present embodiment, decompression is only required for compressed data. Thereafter, the process ends.

Figure 5:
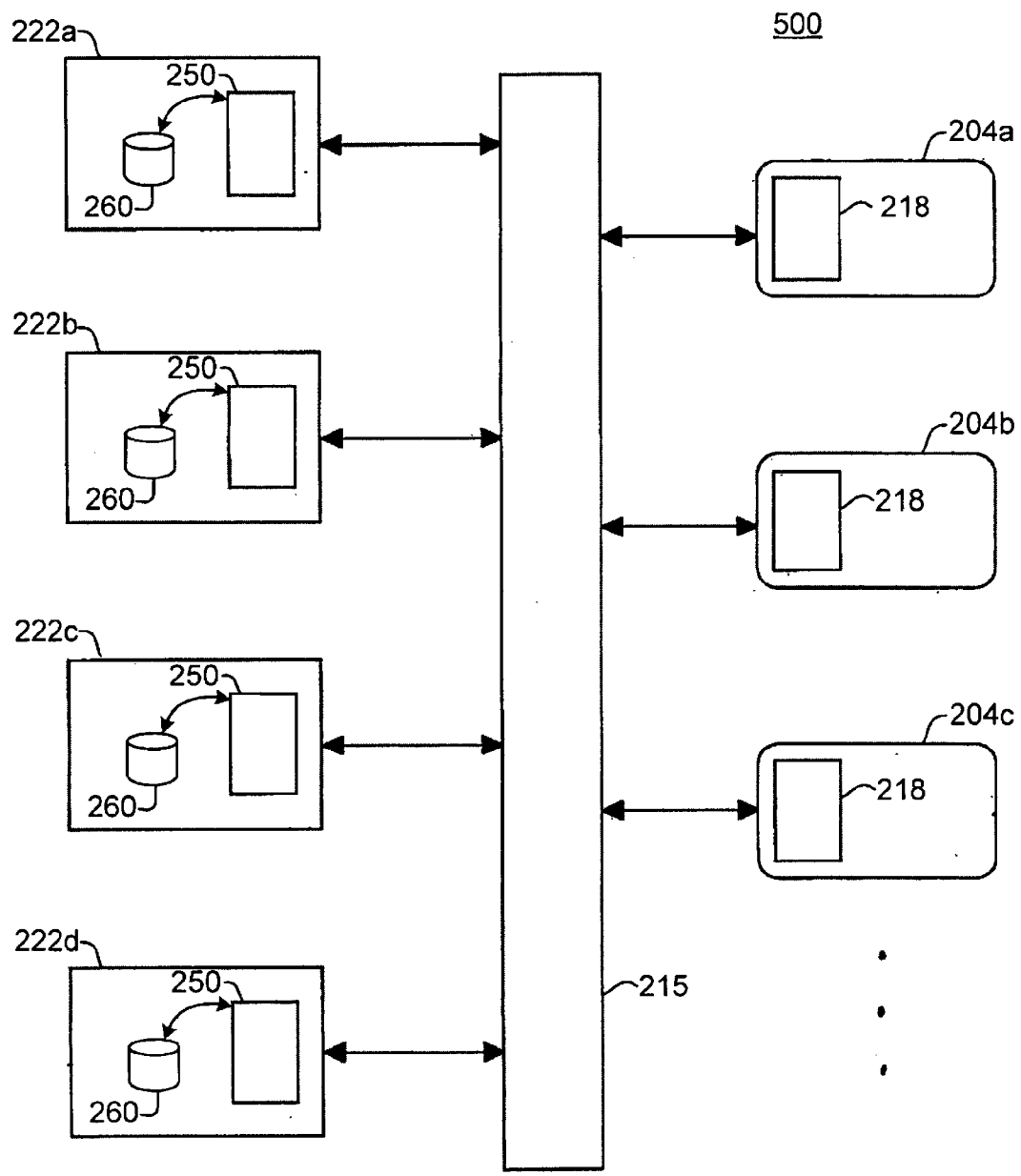
FIG. 5 is a block diagram illustrating a distributed media data playback system according to an embodiment of the present invention.

FIG. 5 is a block diagram of a distributed media data playback system 500 in accordance with an embodiment of the present invention. Distributed media data playback system 500 includes a plurality of servers 222a–222d each including an I/O engine 250 and data store 260. System 500 further includes a plurality of client workstations 204a–204c coupled to each other and to the servers 222a–222d via data network 215. According to the present embodiment, playback logic is implemented within playback engine 218 of each of the client workstations 204. Within system 500, media data can be stored on any one of the servers 222 and can be played from any client workstations 204. In an alternate embodiment, media data may be stored within any one of the servers or workstations and can be played on any one of the servers and workstations of the system.

Figure 6:
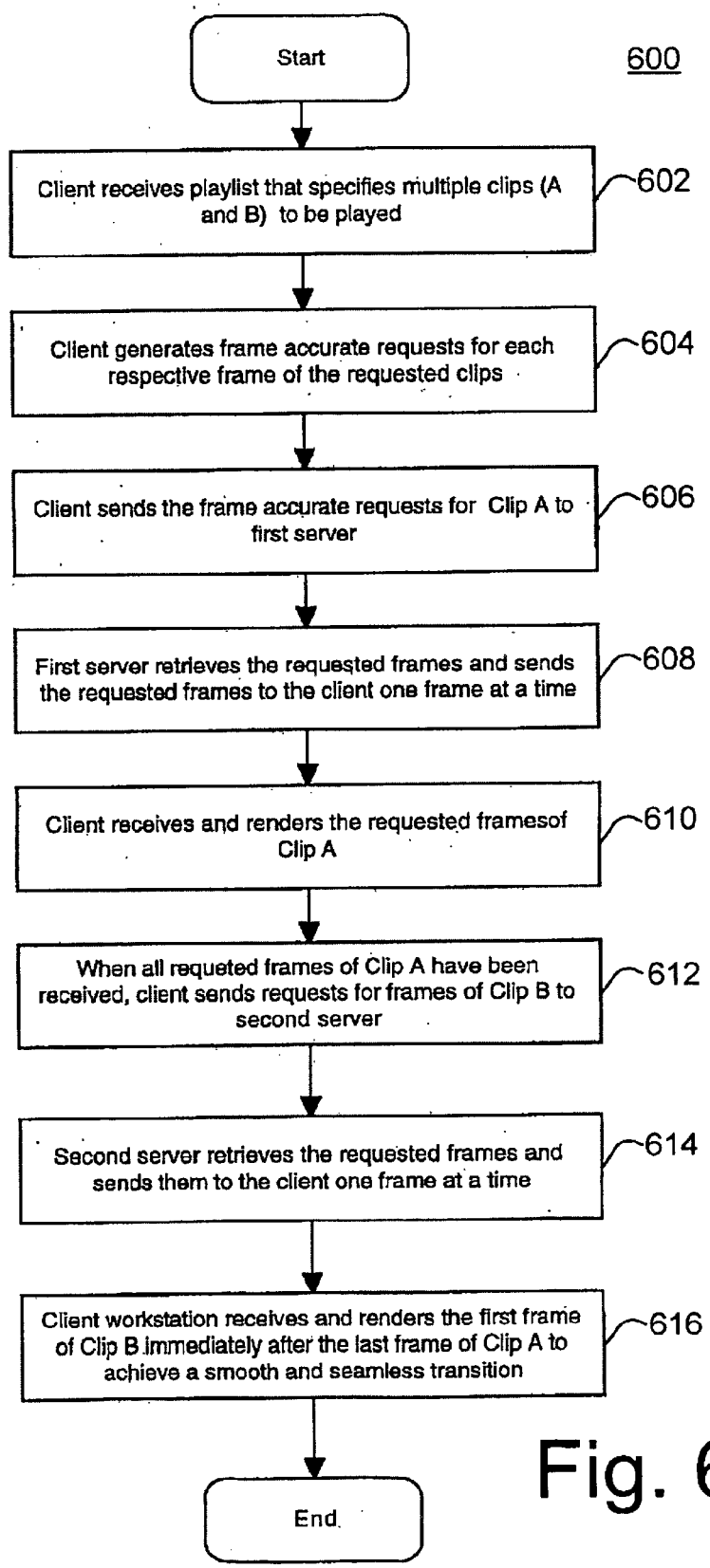
FIG. 6 is a flow diagram illustrating steps of the process of seamlessly playing backing multiple clips in accordance with an embodiment of the present invention.

FIG. 6 is a flow diagram illustrating steps of a process 600 of seamless playback of media data across a data network according to an embodiment of the present invention. For simplicity, process 600 is discussed in conjunction with system 500 of FIG. 5. However, it should be noted that process 600 may be applicable to other systems and system configurations.

At step 602, workstation 204a receives user control inputs that specify a playlist (e.g., a list of clips) to be played.

At step 604, the client workstation 204a of the present embodiment translates the user control inputs into frame accurate requests for the requested clips. Particularly, the client workstation 204a determines the frames to be retrieved and determines where the frames are stored based on the user inputs. For example, the playlist may specify frames 1 to 1000 of a first clip A stored within server 222a and frames 1 to 500 of a clip B stored within server 222b. In the present example, client workstation 204a generates a series of frame accurate requests for frames 1 to 1000 of the first clip A (e.g., "get Frame Clip A 25" and another series of frame accurate requests for frames 1 to 500 of the second clip B (e.g., "getFrame Clip B 50").

At step 606, the client workstation 204a sends the frame accurate requests for the first clip A to the server 222a across network 215. In the present embodiment, server 222a receives the frame accurate requests and converts them to low-level control and I/O signals for retrieving movie data stored therein.

At step 608, the server 222a retrieves the frames of the first clip A and sends the requested frames across data network 215 to the client workstation 204a, one frame at a time.

At step 610, as the client workstation 204a receives and renders the requested frames. In one embodiment, the client workstation 204a also performs decompression as the frame data are transmitted across the network in a compressed format (e.g., MPEG).

At step 612, when the all the requested frames of the first clip A have been received, client workstation 204a begins to send requests for the second clip B to server 222b. It should be noted that, in the present embodiment, there should be sufficient buffer within client workstation 204a for storing the frames such that the last frame of the first clip A is not rendered before the request for the first frame of of the second clip B is sent.

At step 614, the server 222b retrieves the frames of the second clip B and sends the requested frames across data network 215 to the client workstation 204a, one frame at a time.

At step 616, the client workstation 204a receives frames of the second clip B, and begins rendering clip B immediately after the last frame of the first clip A is rendered. Significantly, in the present embodiment, a constant interval is kept between the frames in the first clip A and between the last frame of clip A and the first frame of the second clip B. In this way, a smooth and seamless transition from the first clip A to the second clip B is achieved.

The present invention, a software architecture and control protocol that provides applications with seamless mutliple clip playback capability, has thus been disclosed. It should be appreciated that the present invention has been described with specific references. However, it should be appreciated that specific references within the present disclosure should not be construed to limit the scope of the present invention. Rather, the scope of the present invention should be construed according to the below claims.

What is claimed is:

1. A method of playing media data over a data network comprising the steps of:
   a client receiving a playback control signal from a user;
   provided said playback control signal indicates a clip to be played, said client translating said playback control signal into a plurality of requests corresponding to respective individual frames of said clip;
   said client transmitting said plurality of requests over said data network to a server one request at a time wherein said respective individual frames are stored within a data store in communication with the server; and
   said server retrieving said respective individual frames one frame from said data store at a time and transmitting said respective individual frames to said client one frame at a time.

2. A method as recited in claim 1 further comprising a step of said client scheduling rendition of said respective individual frames.

3. A method as recited in claim 1 further comprising a step of decompressing said respective individual frames provided said media data is compressed.

4. A method as recited in claim 1 wherein said respective individual frames are randomly accessible.

5. A method as recited in claim 1 wherein said media data comprises video data and audio data.

6. A method as recited in claim 5 further comprises a step of said client synchronizing playback of said video data and said audio data.

7. A system for playing media data over a data network comprising:
   a data network;
   a client computer coupled to said data network, wherein said client computer comprises:
      a user interface for receiving a media data playback control signal from a user, and
      a playback engine for translating said media data playback control signal wherein said playback engine translates said media data playback control signal into a plurality of requests each corresponding to a respective frame of media data provided said media data playback control signal indicates a clip to be played; and
   a server computer coupled to receive one or more of said plurality of requests from said client computer via said data network.

8. A system as recited in claim 7 wherein said playback engine transmits one or more of said plurality of requests over said data network to said server computer one request at a time.

9. A system as recited in claim 8 wherein said server retrieves media data corresponding to one or more of said plurality of requests one frame at a time and transmits said media data to said client one frame at a time.

10. A system as recited in claim 7 wherein said playback engine further comprises means for scheduling rendition of said media data.

11. A system as recited in claim 7 wherein said client computer further comprises a decompression engine for decompressing compressed media data.

12. A system as recited in claim 7 wherein said media data comprises video data and audio data.

13. A method as recited in claim 12 wherein said client computer further comprises means for synchronizing playback of said video data and said audio data.

14. A computer readable medium containing therein computer readable codes for causing a computer system to perform a step of playing media data across a data network, the method comprising the steps of:

receiving a playback control signal from a user via a user interface; and provided said playback control signal indicates a clip to be played, translating said playback control signal into a plurality of requests each corresponding to a respective individual frame of said clip and transmitting one or more of said plurality of requests over said data network one request at a time.

15. A computer readable medium as recited in claim 14 wherein said method further comprises the steps of receiving one frame of media data for every request transmitted.

16. A computer readable medium as recited in claim 14 wherein said method further comprises the step of scheduling rendition of one or more of said respective individual frames of said clip.

17. A computer readable medium as recited in claim 14 wherein said method further comprises a step of decompressing said media.

18. A computer readable medium as recited in claim 14 wherein said media data comprises video data and audio data.

19. A computer readable medium as recited in claim 18 wherein said method further comprises a step of synchronizing playback of said video data and said audio data.

20. A method of requesting media data over a data network comprising the steps of:

a client receiving a playback control signal from a user wherein said playback control signal indicates a clip to be played;

said client translating said playback control signal into one or more requests wherein each request corresponds to an individual frame of said clip; and said client transmitting one or more of said plurality of requests over said data network one request at a time.

21. The method of claim 20 further comprising a server receiving one or more of said plurality of requests over said data network one request at a time.

22. The method of claim 21 further comprising said server, responsive to receiving one of said plurality of requests, retrieving media data corresponding to a respective individual frame of said clip.

23. A client computer comprising:

means for receiving a playback control signal from a user wherein said playback control signal indicates a clip to be played;

means for translating said playback control signal into one or more requests wherein each request corresponds to an individual frame of said clip; and means for transmitting the one or more requests over a data network one request at a time.

24. The client computer of claim 23 further comprising a system having a server computer comprising means for receiving one or more of said plurality of requests over said data network one request at a time.

25. The server computer of claim 24 further comprising means for retrieving media data corresponding to a respective individual frame of said clip and responsive to receiving one of said plurality of requests.

26. One or more computer-readable media containing therein computer readable code for causing a client computer to receive a playback control signal from a user wherein said playback control signal indicates a clip to be played; translate said playback control signal into one or more requests wherein each request corresponds to an individual frame of said clip; and transmit one or more of said plurality of requests over said data network one request at a time.

* * * * *